United States Patent
Tartagni et al.

(10) Patent No.: US 6,437,583 B1
(45) Date of Patent: Aug. 20, 2002

(54) CAPACITIVE DISTANCE SENSOR

(75) Inventors: Marco Tartagni, Meldola (IT); Bhusan Gupta, Palo Alto; Alan Kramer, Berkeley, both of CA (US)

(73) Assignee: STMicroelectronics, Inc.., Carollton, TX (US)

( * ) Notice: Subject to any disclaimer, the term of this patent is extended or adjusted under 35 U.S.C. 154(b) by 0 days.

(21) Appl. No.: 09/614,093

(22) Filed: Jul. 11, 2000

Related U.S. Application Data (60) Division of application No. 09/040,261, filed on Mar. 9, 1998, now Pat. No. 6,114,862, which is a continuation-in-part of application No. 09/019,496, filed on Feb. 5, 1998, which is a continuation-in-part of application No. 08/799,548, filed on Feb. 13, 1997, now abandoned.

(30) Foreign Application Priority Data

Feb. 14, 1996  (EP) ............................................. 96830068

(51) Int. Cl.⁷ ............................................... G01R 27/26
(52) U.S. Cl. ....................... 324/687; 324/661; 324/662; 324/663; 324/671; 324/686; 324/688; 382/124; 341/33
(58) Field of Search ................................ 324/661, 662, 324/663, 671, 686, 687, 688, 690; 382/124; 341/33

(56) References Cited

U.S. PATENT DOCUMENTS

| | | | |
|---|---|---|---|
| 3,493,855 A | 2/1970 | Norwich | 324/61 |
| 3,641,431 A | 2/1972 | Pigage et al. | 324/61 |
| 3,781,855 A | 12/1973 | Killen | 340/146.3 E |
| 3,873,927 A | 3/1975 | Overall | 307/650 |
| 3,967,310 A | 6/1976 | Horiuchi et al. | 357/54 |
| 4,016,490 A | 4/1977 | Weckenmann et al. | 324/61 R |
| 4,096,758 A | 6/1978 | Moore | 73/718 |

(List continued on next page.)

FOREIGN PATENT DOCUMENTS

EP  0 226 082  6/1987

(List continued on next page.)

FOREIGN PATENT DOCUMENTS

| | | |
|---|---|---|
| EP | 0 790 479 A1 | 8/1997 |
| EP | 0 791 899 A3 | 8/1997 |
| EP | 0 791 899 A2 | 8/1997 |
| GB | 2279756 A | 1/1995 |
| GB | 2279757 A | 1/1995 |
| GB | 2312514 A | 10/1997 |
| WO | WO 97/40744 | 11/1997 |
| WO | WO 98/49691 | 11/1998 |
| WO | WO 99/28701 | 6/1999 |

OTHER PUBLICATIONS

Woffenbuttel and Regtien, "Integrated Tactile Imager With an Intrinsic Contour Detection Option," *Sensors and Actuators* 16:141–153, Jan./Feb. 1989.

(List continued on next page.)

*Primary Examiner*—Safet Metjahic
*Assistant Examiner*—Wasseem H. Hamdam
(74) *Attorney, Agent, or Firm*—David V. Carlson; Lisa K. Jorgenson (57) ABSTRACT

A distance sensor has a capacitive element in turn having a first capacitor plate which is positioned facing a second capacitor plate whose distance is to be measured. In the case of fingerprinting, the second capacitor plate is defined directly by the skin surface of the finger being printed. The sensor comprises an inverting amplifier, between the input and output of which the capacitive element is connected to form a negative feedback branch. By supplying an electric charge step to the input of the inverting amplifier, a voltage step directly proportional to the distance being measured is obtained at the output.

21 Claims, 5 Drawing Sheets

U.S. PATENT DOCUMENTS

| | | | | |
|---|---|---|---|---|
| 4,161,743 A | | 7/1979 | Yonezawa et al. | 357/54 |
| 4,183,060 A | | 1/1980 | Barnette et al. | 358/128 |
| 4,353,056 A | | 10/1982 | Tsikos | 340/146.3 |
| 4,394,773 A | | 7/1983 | Ruell | 382/4 |
| 4,428,670 A | | 1/1984 | Ruell et al. | 356/71 |
| 4,429,413 A | | 1/1984 | Edwards | 382/4 |
| 4,513,298 A | | 4/1985 | Scheu | 346/140 R |
| 4,547,898 A | | 10/1985 | Tsikos | 382/4 |
| 4,571,543 A | | 2/1986 | Raymond et al. | 324/425 |
| 4,577,345 A | | 3/1986 | Abramov | 382/4 |
| 4,626,774 A | | 12/1986 | Regtien | 324/61 R |
| 4,656,871 A | | 4/1987 | Czarnoski | 73/724 |
| 4,686,531 A | | 8/1987 | Shambroom et al. | 324/870.37 |
| 4,763,063 A | | 8/1988 | Shkedi | 324/60 |
| 4,814,691 A | | 3/1989 | Garbini et al. | 324/661 |
| 4,935,207 A | | 6/1990 | Stanbro et al. | 422/68.1 |
| 4,958,129 A | | 9/1990 | Poduje et al. | 324/661 |
| 5,028,876 A | | 7/1991 | Cadwell | 324/678 |
| 5,325,442 A | | 6/1994 | Knapp | 382/4 |
| 5,373,181 A | | 12/1994 | Scheiter et al. | 257/415 |
| 5,430,381 A | | 7/1995 | Dower | 324/452 |
| 5,530,581 A | | 6/1996 | Cogan | 359/265 |
| 5,659,626 A | | 8/1997 | Ort et al. | 382/125 |
| 5,767,686 A | * | 6/1998 | Kespohl | 324/662 |
| 5,778,089 A | | 7/1998 | Borza | 382/124 |
| 5,828,773 A | | 10/1998 | Setlak et al. | 382/126 |
| 5,852,670 A | | 12/1998 | Setlak et al. | 382/126 |
| 5,862,248 A | | 1/1999 | Salatino et al. | 382/124 |
| 5,869,791 A | | 2/1999 | Young | 178/20.01 |
| 5,903,225 A | | 5/1999 | Schmitt et al. | 340/825.31 |
| 5,920,640 A | | 7/1999 | Salatino et al. | 382/124 |
| 5,973,623 A | | 10/1999 | Gupta et al. | 341/33 |
| 6,011,859 A | | 1/2000 | Kalnitsky et al. | 382/124 |
| 6,025,726 A | * | 2/2000 | Gershenfeld et al. | 324/671 |
| 6,088,471 A | * | 7/2000 | Setlak et al. | 382/124 |
| 6,191,593 B1 | * | 2/2001 | Tartagni et al. | 324/687 |

FOREIGN PATENT DOCUMENTS

| | | |
|---|---|---|
| EP | 0 397 244 A3 | 11/1990 |
| EP | 0 397 244 B1 | 11/1990 |
| EP | 0 397 244 A2 | 11/1990 |
| EP | 0 454 883 B1 | 6/1991 |
| EP | 0 455 070 B1 | 6/1991 |
| EP | 0 710 593 A1 | 5/1996 |
| EP | 0 779 497 A2 | 6/1997 |
| EP | 0 779 497 A3 | 6/1997 |
| EP | 0 786 745 A2 | 7/1997 |
| EP | 0 786 745 A3 | 7/1997 |

OTHER PUBLICATIONS

Sarma and Barranger, "Capacitance–Type Blade–Tip Clearance Measurement System Using a Dual Amplifier With Ramp/DC Inputs and Integration," *IEEE* 41(5):674–678, Oct. 1992.

Young et al., "Novel Fingerprint Scanning Arrays Using Polysilicon TFT's on Glass and Polymer Substrates," *IEEE Electron Device Letters*, 8(1):19–20, 1997 (month unavailable).

Tartagni et al., "A 390dpi Live Fingerprint Imager Based on Feedback Capacitive Sensing Scheme," *IEEE International Solid–State Circuits Conference*, Feb. 7, 1997, 5 p.

\* cited by examiner

CAPACITIVE DISTANCE SENSOR

CROSS-REFERENCE TO RELATED APPLICATION

This application is a Divisional of pending U.S. patent application Ser. No. 09/040,261, filed Mar. 9, 1998, now U.S. Pat. No. 6,114,862 which is a continuation-in-part of U.S. patent application Ser. No. 09/019,496, filed Feb. 5, 1998; which is a continuation-in-part of U.S. patent application No. 08/799,548, filed Feb. 13, 1997 now abandoned.

TECHNICAL FIELD

The present invention relates to a capacitive distance sensor, in particular, a small-distance (micrometric to millimetric) sensor.

BACKGROUND OF THE INVENTION

Small-distance sensors are used, among other things, as pressure, proximity, roughness, mechanical stress and acceleration sensors, for example, in integrated microphony and for acquiring fingerprints.

For fingerprint acquisition in particular (to which reference is made herein purely by way of example of a preferred application of the present invention), known sensors include various types, such as optical, piezoelectric, variable-conductance, thermal, ultrasonic and capacitive, the most promising of which in terms of precision, size, production and cost are capacitive sensors.

Capacitive sensors are based on the principle that the capacitance between two capacitor plates is inversely proportional to the distance between them, so that, using the contacting dermal tissue itself as one capacitor plate of the sensor capacitor, and by determining the capacitance, it is possible to locate the ridges and grooves of the fingerprint. This is the principle used in U.S. Pat. No. 5,325,442 to Knapp, which relates to a sensor comprising an array of elementary cells, each comprising a sensitive electrode and an electronic switching device. The electrode is coated with dielectric material, such as passivation oxide or a polymer compound, onto which the finger is placed with the epidermis in contact with the dielectric material. When a cell is selected, a predetermined variation in potential is applied to the electrode to induce at the terminals an appropriate variation in charge. The extent of variation in charge depends on the capacitance associated with the electrode and is read by amplifying elements connected to the output of the device. To improve efficiency, the above patent suggests a surface grid connected to a reference potential to appropriately bias the skin tissue.

In the above known capacitive sensor, the capacitance between the capacitor plates of a capacitor varies in inverse proportion to the distance between the capacitor plates, which therefore poses the problem of normalizing the resulting data. In particular, if the capacitance being measured is very small, serious difficulty is encountered in detecting the charge and discriminating between the various intermediate charge levels corresponding to different grey levels of the image to be generated in the presence of a low signal/noise ratio.

SUMMARY OF THE INVENTION

The present invention is directed to a capacitive distance sensor for measuring small distances between the sensor device and an object. The distance sensor includes first and second capacitor plates for forming respective first and second capacitances between the capacitor plates and the object when positioned adjacent to the object. A fringing, third capacitance may also be present between the two capacitor plates. The first and second capacitor plates are arranged in a geometric pattern in which a plurality of faces of the first capacitor plate are positioned adjacent to and facing a plurality of faces of the second capacitor plate. The distance sensor also includes an amplifier having an input connected to one of the capacitor plates and an output connected to another one of the capacitor plates to form a negative feedback branch that includes the first and second capacitances. The sensor device may also include a grounding element surrounding the first and second capacitor plates to provide a discharge path for electrostatic discharge caused by the object.

One embodiment of the invention is directed to a method of making a capacitive distance sensor that includes one or more sensor cells each with first and second capacitor plates. The method includes determining an expected range of sizes of objects the sensor will be used to detect and determining a total perimeter value for each of a plurality of capacitor patterns. Each capacitor pattern includes a different arrangement of the first and second capacitor plates and the total perimeter value is the sum of the perimeter values for the first and second capacitor plates. The method selects one of the capacitor patterns based on the expected size of the object and on the total perimeter values determined for the capacitor patterns. The selecting step includes selecting whichever one of the capacitor patterns has the largest total perimeter value if the object is smaller than each of the one or more sensor cells. The selected capacitor pattern is then formed in at least one of the one or more sensor cells.

Fingerprint and other biometric sensors formed in accordance with the present invention will have application in preventing the unauthorized use of cellular phones, laptop computers, automobiles, automated teller machines, credit/debit card readers, POS terminals, and smart cards. They are also useful in authenticating electronic financial transactions, personal e-mail, providing access to buildings, etc. Biometric identification, such as personal identification and authentication alternatives which could be accomplished by mounting a sensor as taught by the present invention include hand or finger shape, facial shape, and facial features. In addition, the sensor device of the present invention could be used for non-biometric sensing, such as handwriting detection, switch actuation, and any other device requiring sensitivity to object proximity.

DETAILED DESCRIPTION OF THE INVENTION

Figure 1:
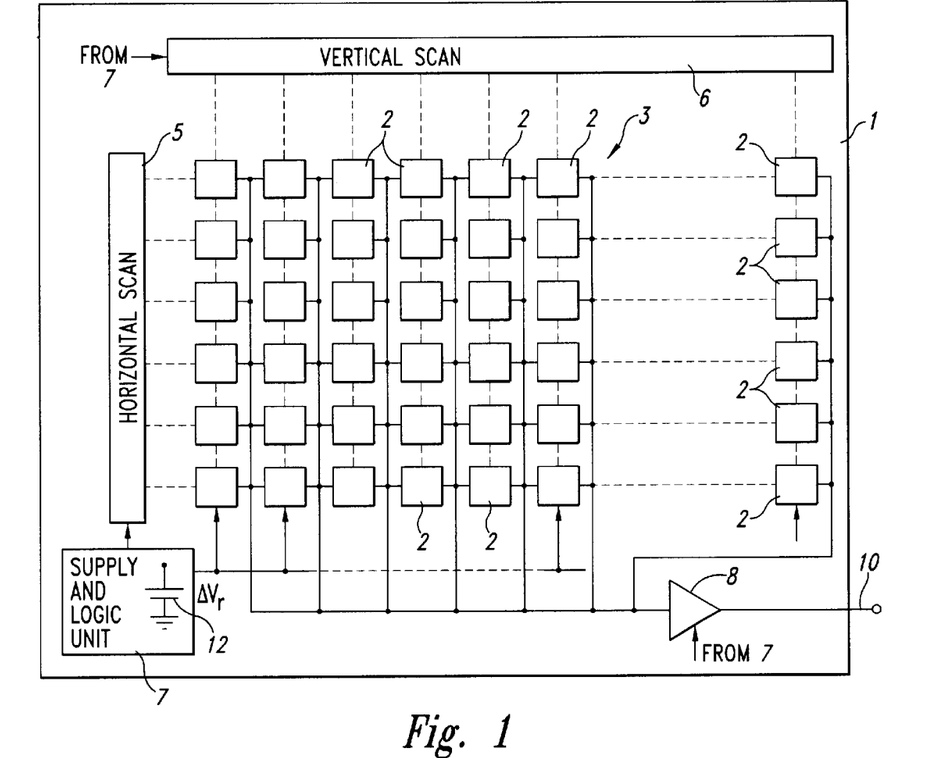
FIG. 1 shows a sensor device for acquiring personal feature scans, such as fingerprints, according to the present invention.

FIG. 1 shows a sensor device 1, preferably embodied in an integrated chip, for sensing a distance between the sensor device and an object according to the present invention. As used herein, the term "object" is used according to its broadest meaning and may include solid, liquid, gas, and plasma-based things. The sensor device 1 includes a number of cells 2 arranged to form an array 3 and each constituting an elementary sensor. The simplicity of the individual cells 2 enables the sensor device 1 to be implemented in integrated form on a single semiconductor chip.

The sensor device 1 also comprises a horizontal scanning stage 5 and a vertical scanning stage 6 for enabling one of the cells 2 at a time according to a predetermined scanning pattern. Preferably, to read the cells, stages 5, 6 enable the outputs of the cells 2 sequentially, and comprise shift registers. Alternatively, other cell reading devices could be employed, such as a random access decoder that reads addressed cells rather than sequentially scanning the cells 2.

The sensor device 1 also comprises a supply and logic stage 7, which supplies the components of the device with power (including the cells 2), feeds the necessary reference voltages, and controls the sequence of steps provided for (as explained in detail below). In particular, FIG. 1 shows that the supply and logic stage 7 includes a voltage source 12 for generating a reference voltage variation $\Delta V_R$. A buffer 8 is connected to the outputs of all the cells 2, and supplies sequentially, at output 10 of the sensor array 3, the signals present at the outputs of the cells 2 enabled by scanning stages 5, 6.

Figure 2:
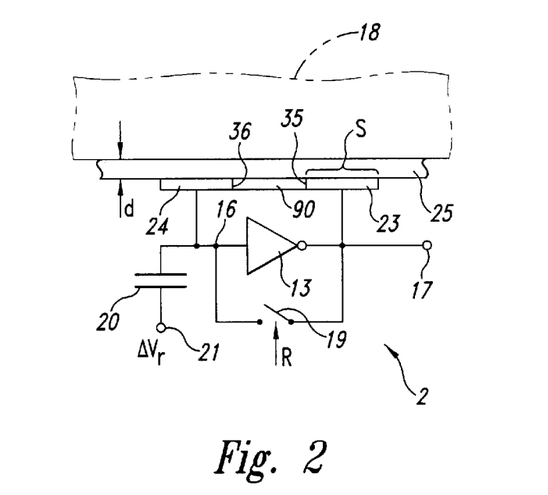
FIG. 2 shows a detail of a cell of the sensor device shown in FIG. 1.

As shown in FIG. 2, each cell 2 comprises a low-power inverting amplifier 13 of gain A, in turn presenting an input 16 at input voltage $V_i$, and an output 17, at output voltage $V_O$, which also defines the output of cell 2. Each cell 2 also includes first and second capacitor plates 23, 24 of equal area positioned facing the skin surface 18 of the finger being printed. Preferably, the first and second capacitor plates 23, 24 are coplanar with respect to each other. In addition, the first capacitor plate 23 includes a face 35 that faces a face 36 of the second capacitor plate 24 and the faces 35, 36 are separated from each other by a first passivation layer 90 as discussed in more detail with respect to FIGS. 8–12. A reset switch 19 is connected between the input 16 and output 17 of the inverting amplifier 13. An input capacitor 20 is connected between an input 21 of the cell 2 and the input 16 of the inverting amplifier 13.

More specifically, the first and second capacitor plates 23 and 24 are respectively connected to the output 17 and the input 16 of the inverting amplifier 13, thus realizing a charge integrator. The first and second capacitor plates 23 and 24 are covered with a dielectric insulating layer 25 that covers the face of integrated sensor device 1, including the entire array 3 of cells 2. In use, therefore, skin surface 18 forms a third capacitor plate facing the first and second capacitor plates 23, 24, and defining with them a pair of series capacitors feedback connected between input 16 and output 17 of inverting amplifier 13. Accordingly, a contact. grid is not required to bias the skin surface at constant voltage. In addition, a fringing, third capacitance is formed between the first and second capacitor plates 23, 24.

The switch 19 is a controlled switch formed using any known technology (e.g., a MOS switch) and receives a control signal R from the supply and logic stage 7. The input 21 of the cell 2 is also connected to the supply and logic stage 7 to receive a voltage signal $\Delta V_R$ as explained below.

To acquire fingerprints, the skin surface 18 is placed on the surface of integrated sensor device 1, at array 3, to complete the capacitors forming the feedback loops of amplifiers 13 of all the cells 2. At the start of the measurement, the switches 19 of all the cells are closed, and the voltage level at each of inputs 21 is constant, so that the input voltage $V_i$ of all the cells 2 is brought to the same potential as the output voltage $V_O$, between the supply and ground at a high-gain point or logical threshold Vt of inverting amplifier 13.

Subsequently, the supply and logic stage 7 opens all the switches 19 in parallel, and supplies all the inputs 21 with a voltage step $\Delta V_R$, so that a charge variation $\Delta Q = C_i^* \Delta V_R$ (where $C_i$ is the capacitance of input capacitor 20) is induced at the terminals of each input capacitor 20 to permit a reading, as explained below, of the local distance "d" between the first and second capacitor plates 23, 24 and skin surface 18 facing them. The local distance "d" varies according to whether the point being measured corresponds to a groove, a ridge or a point between the two.

Scanning stages 5, 6 then sequentially enable the reading of cells 2, so that the voltage signal at the output 10 of the buffer 8 is supplied to a system for representing the distance, in known manner, by means of grey levels, and so providing a three-dimensional display of the skin surface.

The way in which the local distance "d" between the first and second capacitor plates 23, 24 of each cell 2 and the third capacitor plate formed by the skin surface 18 is detected will now be described with reference to the equivalent electric diagram in FIG. 3.

Figure 3:
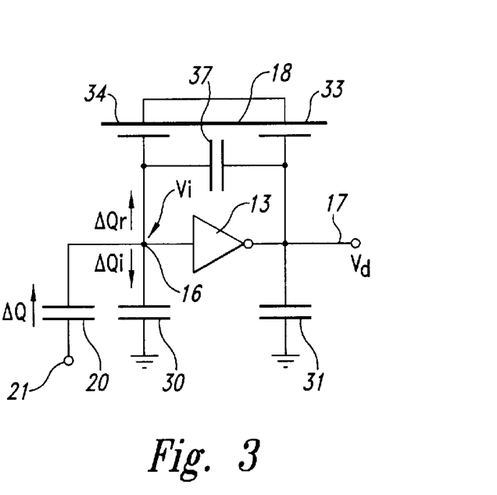
FIG. 3 shows an electric equivalent of the cell shown in FIG. 2.

FIG. 3 shows an equivalent input capacitance 30 and an equivalent output capacitance 31 of the inverting amplifier 13 and the charge flow direction (indicated by the arrows) corresponding to the voltage variations at the capacitor plates. FIG. 3 also shows a first feedback capacitor 33 formed by the first capacitor plate 23 and the skin surface 18, a second feedback capacitor 34 formed by the second capacitor plate 24 and the skin surface 18, and a third feedback capacitor 37 formed between the first and second capacitor plates 23, 24.

Assuming $C_I$ is the equivalent input capacitance 30 of inverting amplifier 13; $C_r$ is the total capacitance of the feedback capacitors 33, 34, and 37; A is the gain of the inverting amplifier 13; $\Delta Q$ is the charge variation induced in the equivalent input capacitance 30 by voltage step $\Delta V_R$; $\Delta Q_i$ is the charge variation stored in the equivalent input capacitance 30 as a result of step $\Delta V_R$; $\Delta Q_r$ is the charge variation in the feedback branch formed by the series connection of the feedback capacitors 33, 34; $\Delta V_i$ is the voltage step at the input 16 of the inverting amplifier 13, $\Delta V_o$ is the corresponding voltage variation at the output 17 (equal to $-A \Delta V_i$); S is the size of the top face (the face closest to the skin surface 18) of each capacitor plate 23, 24 of capacitors 33, 34; $\in_o$ is the electric constant (seeing as, in the fingerprinting application, the average distance between the skin surface 18 and the insulating layer 25—typically 60 μm at the grooves—is greater than the thickness of layer 25—typically 2 μm); and "d" is the local distance between capacitor plates 23, 24 and skin surface 18 (approximately the same for both capacitor plates 23, 24, in view of the very small size of cells 2 - typically about 45 μm); then total feedback capacitance $C_r$ is given by the following equation:

$$C_r = \frac{S\varepsilon_o}{2d} \tag{1}$$

Moreover:

$$\Delta Q = \Delta Q_i + \Delta Q_r = C_i \Delta V_i + C_r(\Delta V_i - \Delta V_o) = -\frac{\Delta V_o}{A}(C_1 + C_r) - \Delta V_o C_r$$

so that:

$$\Delta V_o = -\frac{\Delta Q}{\frac{C_1}{A} + \left(1 + \frac{1}{A}\right)C_r} \tag{2}$$

Substituting (1) in (2) gives:

$$\Delta V_o = \frac{\Delta Q}{\frac{C_1}{A} + \left(1 + \frac{1}{A}\right)\frac{S\varepsilon_o}{2d}} = -\frac{2\Delta Q d}{\frac{2C_1 d}{A} + \left(1 + \frac{1}{A}\right)S\varepsilon_o} \tag{3}$$

Assuming A<<1,(3) becomes:

$$\Delta V_o = d\frac{2\Delta Q}{S\varepsilon_o} \tag{4}$$

Consequently, by virtue of the negative feedback effected by capacitive coupling the output 17 and input 16 of the inverting amplifier 13 via the skin tissue, the variation in output voltage as a result of the charge step is directly proportional to the distance between the capacitor plates 23, 24 and the skin surface 18, in turn dependent on the three-dimensional structure of the skin. For a fixed amount of the input voltage step $\Delta V_i$, the output voltage of the inverter 13 will range between two extremes, depending on feedback capacitance value: (i) the upper saturation level if no feedback capacitance is present; (ii) a value close to the logical threshold when the feedback capacitance is large.

With appropriate amplification levels (e.g., 1000–2000), it is possible to detect differences in capacitance of about ten fF and hence micrometric distances. The output signals of the device according to the invention are therefore such, when converted into grey levels, as to provide a highly reliable representation of the three-dimensional structure of the skin surface.

Figure 4:
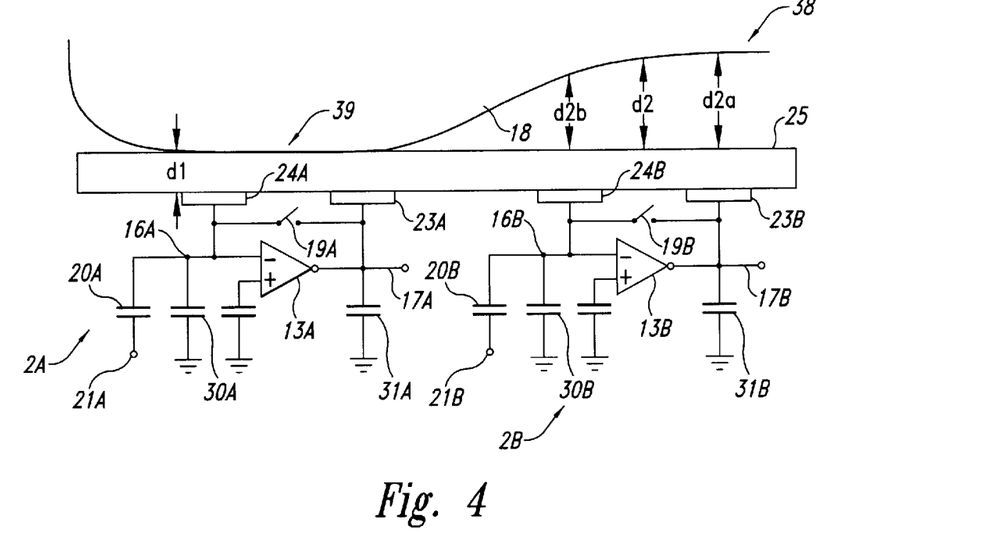
FIG. 4 is an illustration showing a finger positioned on two adjacent cells of the sensor device shown in FIG. 1.

The operation of the sensor device 1 can be further appreciated with regard to FIG. 4, which is an illustration of the skin surface 18 positioned on first and second adjacent cells 2A, 2B of the sensor device 1. It is to be understood that the present invention will have application to thumbs, palms, and any contact surface where an image is desired. Each of the adjacent cells 2A, 2B is substantially identical to the cell 2 shown in FIGS. 2–3, and thus, additional detailed discussions of the elements of cells 2A, 2B are being omitted for simplicity. Switches I9A and 19B constitute reset switches, as explained in more detail elsewhere herein. The elements of the adjacent cells 2A, 2B are marked with labels corresponding to the labels of FIGS. 2 and 3 with an "A" and a "B" added to the cells 2A and 2B, respectively.

The skin surface 18 shown in FIG. 4 includes a ridge 39 adjacent to the first cell 2A and a valley 38 adjacent to the second cell 2B. As a result, the first and second cells 2A, 2B will each produce different capacitive coupling responses in the sensor device 1. Accordingly, the first cell 2A will sense a smaller distance d1, signifying the ridge 36, than the second cell 2B, which senses a larger distance d2, signifying the valley 38. The distance d2 sensed by the second cell 2B will be the average of a distance d2a between the first capacitor plate 23B and the portion of the skin surface 18 directly above the first capacitor plate 23B and a distance d2b between the second capacitor plate 24B and the portion of the skin surface 18 directly above the second capacitor plate 24B. From a lumped-model point of view, this structure realizes a three-capacitor scheme that can sense the difference between a contacting member, a ridge, and a non-contacting member, a valley.

Figure 5:
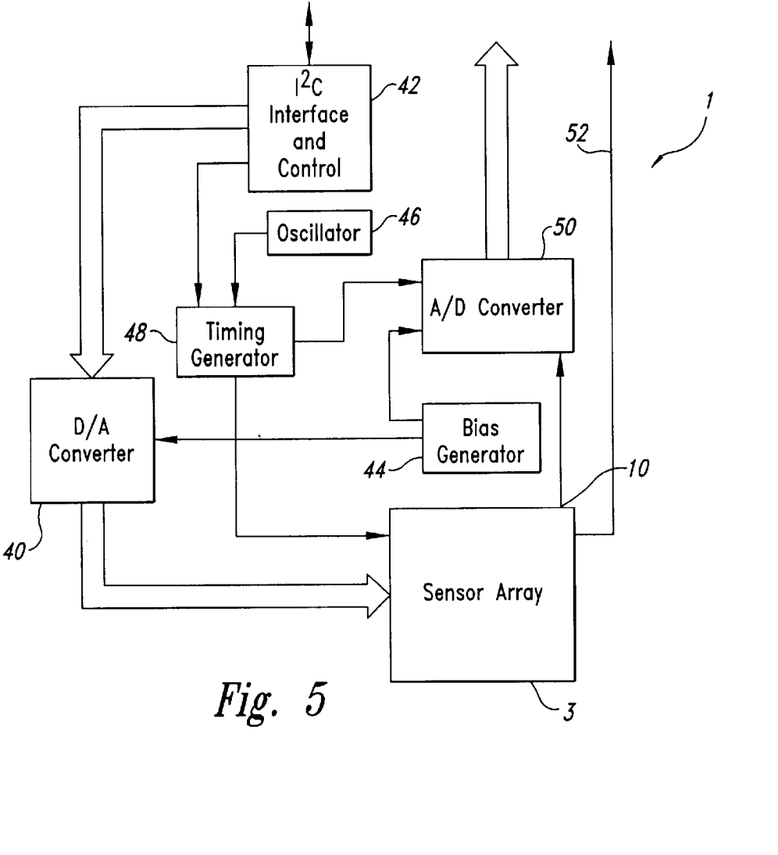
FIG. 5 is a block diagram of the sensor device shown in FIG. 1.

A block diagram of the sensor device 1 according to one embodiment of the invention is shown in FIG. 5. The sensor device 1 includes the sensor array 3 which is coupled by a digital to analog (D/A) converter 40 to an I²C interface and control device 42 and a bias generator 44. For simplicity, the horizontal and vertical scanners 5,6 and the output buffer 8 are not shown in FIG. 5, but are part of the sensor device 1 shown in FIG. 5. The sensor device 1 also includes an oscillator 46 and timing generator 48 coupled to the sensor array 3. The D/A converter 40, I²C interface and control device 42, bias generator 44, oscillator 46, and timing generator 48 together implement the functionality of the supply and logic unit 7 discussed above. The I²C interface and control device 42 provides a bidirectional communication protocol that enables the sensor device 1 to communicate with a controller, such as a standard computer. The D/A converter 40 converts digital control signals from the I²C interface and control device 42 into analog signals that are transmitted to the sensor array 3 to control the scanning of the cells 2 by the horizontal and vertical scanners 5,6. The D/A converter 42 also provides analog biases, such as the voltage step $V_r$. The timing generator 48 takes a single clock signal from the oscillator 46 and generates timing signals that are provided to the sensor array 3 under the control of the I²C interface and control device 42.

To enable the distance measurements (represented by voltages) to be output to the computer coupled to the sensor device 1, the sensor device includes an analog to digital (A/D) converter 50 coupled between the output 10 of the sensor array 3 and the computer. The A/D converter 50 also is coupled to the bias generator 44 and timing generator 48 to enable the A/D converter 50 to convert the analog voltage measurements output by the sensor array 3 to digital signals that are recognized by the computer as distance measurements. The sensor array 3 also is directly coupled to the computer by a synchronization line 52 that provides the computer with synchronization signals that help the computer properly interpret the digital distance measurements received from the A/D converter 50.

Figure 6:
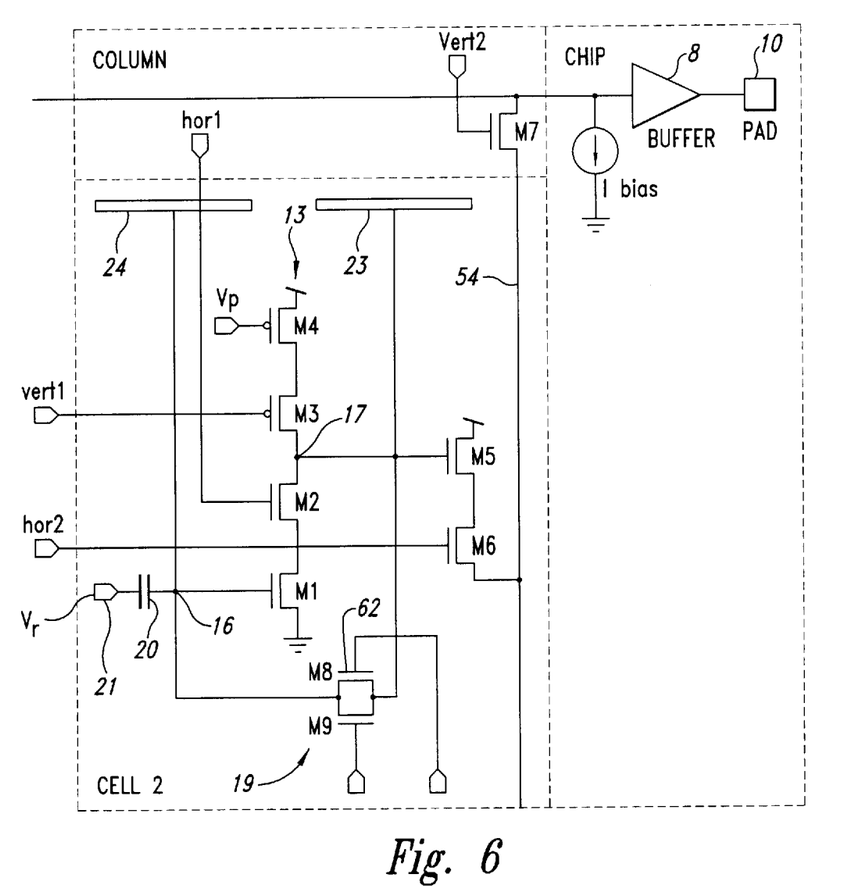
FIG. 6 is a circuit diagram of one embodiment of the cell shown in FIG. 2.

A detailed schematic of one embodiment of the cell 2 of FIG. 2 is illustrated in FIG. 6. The cell 2 includes first and second transistors Ml, M2 of the N-channel type and third and fourth transistors M3, M4 of the P-channel type connected together in series to comprise a high gain cascode inverting amplifier 13. A first horizontal scan line (howl) and a first vertical scan line (vert1) are coupled respectively from the horizontal and vertical scanners 5, 6 to the second transistor M2 and the third transistor M3 to ensure that only one cell at a time is powered, thereby limiting power consumption of non-addressed cells. A gate terminal of the first transistor M1 is coupled by the input capacitor 20 of the cell 2 to the cell input 21. $\Delta V_R$, as discussed above. When the voltage step $\Delta V_R$ is applied to the input node 21, a charge amount $dQ=C_i\Delta V_R$ is sinked from the amplifier input 16 as previously explained. This mode of operation is useful since by changing the amount of $\Delta V_R$, the sensor can deal with different ranges of sensed capacitances. The gate of the fourth transistor M4 is coupled to a fixed bias $V_p$.

The output 17 of the inverting amplifier 13 is buffered by a source follower stage (fifth transistor M5) into a vertical output line 54 by means of a sixth transistor M6. A seventh transistor M7 couples the vertical output line 54 to the output buffer 8 of the sensor device 1. The gate of the sixth transistor M6 is coupled by a second horizontal scan line (hor2) to the horizontal scanner 5 and the gate of the seventh transistor M7 is coupled by a second vertical scan line (vert2) to the vertical scanner 6, which ensures that only one cell at a time is communicating with the output buffer 8. This greatly reduces the output capacitance of the follower Stage M6 since only one vertical output line at a time is connected to the output buffer 8.

The reset switch 19 is connected between the input 16 and output 17 of the inverting amplifier 13 as discussed above. The reset switch 19 is designed to prevent charge injection in the input 16 from saturating the inverting amplifier 13. If the switch-off transient of the reset switch 19 is slow enough compared to the inverse of the gain bandwidth product of the inverting amplifier 13, most of the channel charge of the reset switch is injected into the output node. The reset switch 19 includes eighth and ninth transistors M8, M9 with their drain terminals coupled together to the input 16 and their source terminals coupled together to the output 17. The size of the eighth transistor M8 is small in order to reduce the absolute amount of injected charge. Reducing the dimension of the eighth transistor M8 degrades the stability of the inverting amplifier 13 since it reduces the loop gain-bandwidth. In this design, the ninth transistor M9 is stronger than the eighth transistor M8 and is activated at a different phase than the eighth transistor M8 is introduced. During the reset phase, both transistors M8, M9 are set, reducing resistance of the feedback loop so output ringing is contained. During charge integration, the ninth transistor M9 is first opened so its channel charge is absorbed by the eighth transistor M8. Finally, the eighth transistor M8 is opened by a slow gate transient to ensure low charge-injection on the input. It will be appreciated that the ninth transistor M9 is optional because charge injection is less of an issue if the plate capacities are bigger.

Figure 7:
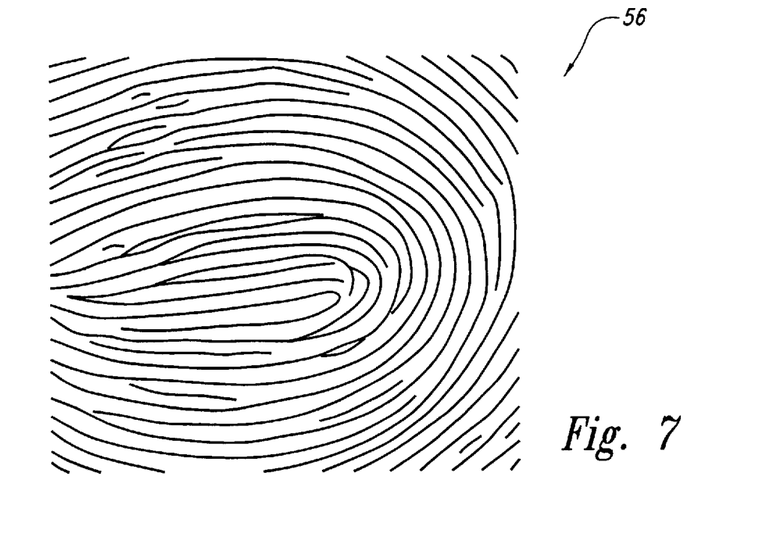
FIG. 7 is an image of a fingerprint obtained from the sensor device shown in FIG. 1.

In a preferred embodiment, the chip is made using a 0.7 $\mu$m CMOS digital process. The cell area is 50×50 $\mu$m, giving a 508 dpi resolution. A sample image 56 produced for a 200×200 window is shown in FIG. 7, which clearly shows grey levels. The image disappears as the finger is removed.

Figure 8:
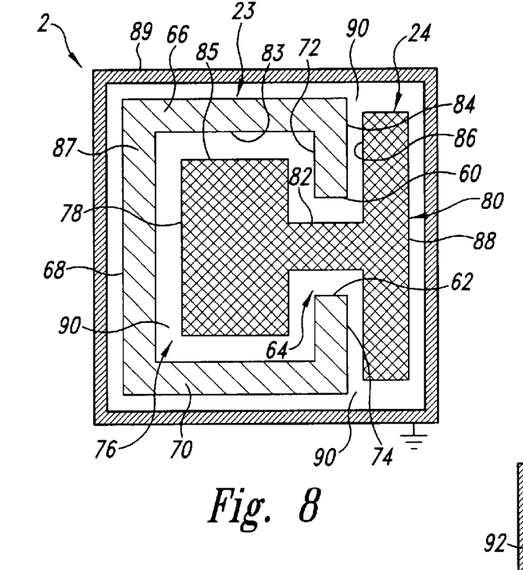
FIG. 8 is a top elevational view of a first embodiment of the cells shown in FIG. 2.

The sensitivity of the individual sensor cells 2, and thus the entire sensor device 1, can be controlled and enhanced by arranging the first and second capacitor plates 23, 24 in one or more planar patterns. A first pattern of the capacitor plates 23, 24 is shown in FIG. 8. The first capacitor plate 23 is C-shaped and has two ends 60, 62 that define a gap 64 therebetween. The first capacitor plate 23 includes elongated first, second, and third segments 66, 68, 70 that define three sides of the C-shape and shorter fourth and fifth segments 72, 74 that terminate in the first and second ends 60, 62 on a fourth side of the C-shape. The five segments 66–74 of the first capacitor plate 23 together define an inner area 76 within which is positioned a rectangular inner portion 78 of the second capacitor plate 24. The second capacitor plate 24 also includes an elongated, rectangular outer portion 80 outside of the first capacitor plate and a connector portion 82 that connects the inner portion 78 with the outer portion 80.

The first capacitor plate 23 includes several faces that are adjacent to and face corresponding faces of the second capacitor plate 24 which allows fringing capacitances to be developed between the capacitor plates. In particular, the first capacitor plate 23 has first and second faces 83, 84 that face respective first and second faces 85, 86 of the second capacitor plate 24. In addition, the first and second capacitor plates 23, 24 respectively include upper faces 87, 88 that face the object being sensed and allowed first and second direct capacitances to develop between the object and the first and second capacitor plates, respectively.

Completely surrounding the sensor cell 2 is a ground ring 89 that is connected to ground to provide a discharge path for any electrostatic discharge that is caused by the object being sensed. For example, if the sensor cell 2 is being used to detect a fingerprint, the finger may produce an electrostatic discharge as it approaches the sensor cell, which would produce an erroneous distance measurement if allowed to discharge through one of the capacitor plates 23, 24. Like the capacitor plates 23, 24, the ground ring 89 is a metal pattern layer that can be deposited according to well-known techniques as part of an integrated circuit that includes the elements shown in FIG. 2.

The ground ring 89 is separated electrically and physically from the capacitor plates 23, 24 by a first passivation layer 90 that also physically separates and electrically insulates the first capacitor plate 23 from the second capacitor plate 24. The first passivation layer 90 can be composed of many known dielectric materials, such as phosphorous doped glass (PSG), silicon dioxide, silicon nitride, and silicon oxynitride. A second passivation layer (not shown in FIG. 8) is deposited on the capacitor plates 23, 24, ground ring 89, and first passivation layer 90 and acts as the dielectric insulating layer 25 shown in FIGS. 2 and 4. The average distance between the first and second capacitor plates 23, 24 and the embodiment shown in FIG. 8 generally is between 0.5 and 4 $\mu$m which is similar to the typical thickness of the insulating layer 25.

The total feedback capacitance experienced by the inverter amplifier 13 (FIG. 2) is composed of a first direct capacitance between the first capacitor plate 23 and the object, a second direct capacitance between the second capacitor plate 24 and the object, and a fringing capacitance between the first capacitor plate 23 and the second capacitor plate 24. The first and second direct capacitances vary according to the respective areas of the upper faces of the first and second capacitor plates 23, 24 as described in Equation 1. As such, increasing the areas of the capacitor plates 23, 24 increases the total capacitance, which provides more sensitivity and a greater dynamic range for the sensor device 1. The fringing capacitance varies according to the perimeter values for the first and second capacitor plates 23, 24, that is, a total length of the perimeters of the capacitor plates. The widths of the top surfaces of the capacitor plates 23, 24 generally is an order of magnitude greater than the depth of the sides of the capacitor plates, and thus, the direct capacitances generally contribute more to the total capacitance than the fringing capacitance.

Based on experiments done to date, it appears that objects adjacent to the sensor device 1 affect both the direct capacitances between the capacitor plates 23, 24 and the object and the fringing capacitance between the capacitor plates. As such, increasing the total perimeter of the capacitor pattern, assuming the total area does not change, will cause the sensor cell 2 to detect the distance between the sensor cell and the object to a greater degree due to fringing capacitance. This may explain why patterns with higher total perimeters appear to be more sensitive to objects smaller than an individual sensor cell 2, such as molecules.

Figure 9:
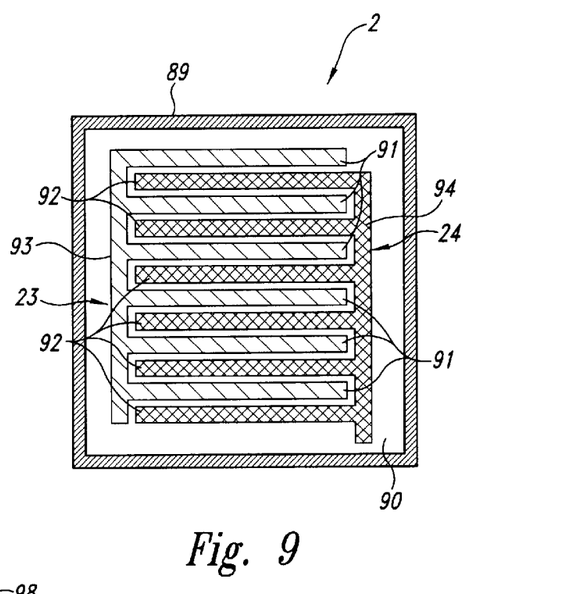
FIG. 9 is a top elevational view of a second embodiment of the cells shown in FIG. 2.

A second embodiment of the sensor cell 2 is shown in FIG. 9. In the embodiment shown in FIG. 9, the first capacitor plate 23 has several fingers 91 that are interdigitated with fingers 92 of the second capacitor plate 24. A first connecting segment 93 connects the fingers 91 of the first capacitor plate to each other and a second connecting segment 94 connects the fingers 92 of the second capacitor plate to each other. As in FIG. 8, the first capacitor plate 23 is separated from the second capacitor plate 24 and from the ground ring 89 by the first passivation layer 90. In addition, the first capacitor plate 23 has several faces that face corresponding faces of the first capacitor plate. As can be seen, the total perimeter for the capacitor plates 23, 24 in the pattern shown in FIG. 9 is greater than the total perimeter of the capacitor plates 23, 24 in the pattern shown in FIG. 8. As a result, the interdigitated pattern shown in FIG. 9 likely will have greater fringing capacitance than the pattern shown in FIG. 8. In addition, the interdigitated pattern of FIG. 9 will have a greater sensitivity to smaller objects, such as water vapor, than the pattern of FIG. 8. However, the pattern of FIG. 8 generally will be more robust and cost less than the interdigitated pattern of FIG. 9 because of the complicated nature of the interdigitated pattern.

Figure 10:
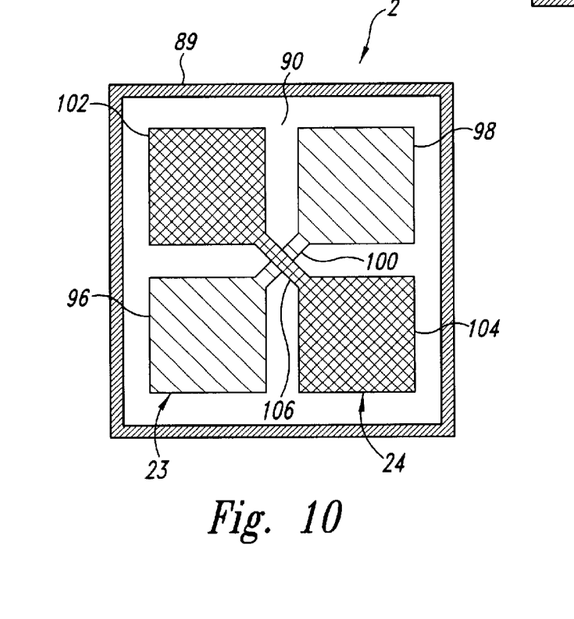
FIG. 10 is a top elevational view of a third embodiment of the cells shown in FIG. 2.

A third embodiment of the sensor cell 2 is shown in FIG. 10. The first capacitor plate 23 includes two rectangular portions 96, 98 positioned in diagonally opposite first and second sections of the sensor cell 2 and are connected by a connector portion 100. Similarly, the second capacitor plate also includes two rectangular portions 102, 104 positioned in diagonally opposite third and fourth sections of the sensor cell 2 and are connected by a second connector portion 106. To avoid shorting the capacitor 23, 24, one of the connector portions 100, 106 is positioned in a lower metal layer than the other connector portion with a passivation layer (not shown) electrically insulating the two connector portions. As in FIGS. 8–9, the first capacitor plate 23 is separated from the second capacitor plate 24 and from the ground ring 89 by the first passivation layer 90. In one of the pattern shown in FIG. 10, each capacitor plate 23, 24 is approximately 441 $\mu m^2$, for a total capacitor area of 882 $m^2$.

Figure 11:
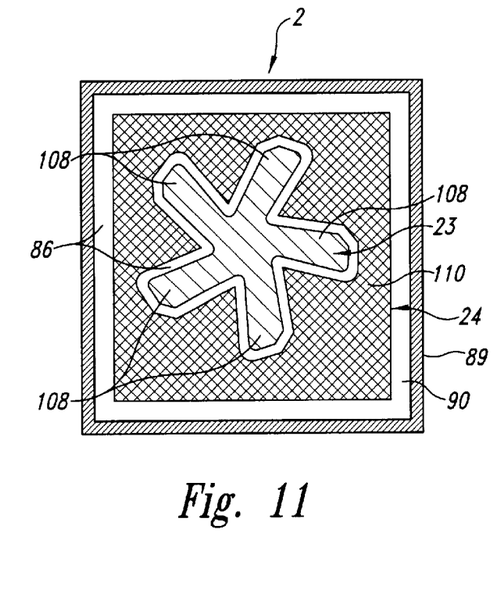
FIG. 11 is a top elevational view of a fourth embodiment of the cells shown in FIG. 2.

A fourth embodiment of the sensor cell 2 is shown in FIG. 11. The first capacitor plate 23 includes five fingers 108 extending outwardly from a central portion 110. The first capacitor plate 23 is coplaner with and completely surrounded by the second capacitor plate 24. The second capacitor plate 24 also includes five fingers 110 that interdigitate with the five fingers 108 of the first capacitor plate 23. Once again, the first capacitor plate 23 is separated from the second capacitor plate 24 and from the ground ring 89 by the first the passivation layer 90. It will be appreciated that the patterns shown in FIGS. 10 and 11 have smaller total perimeters and the total perimeter of the interdigitated pattern of FIG. 9, and thus, likely would be less sensitive to objects smaller than the sensor cell 2, such as water vapor and molecules. The patterns of FIGS. 10 and 11 are easier to make than the pattern of FIG. 9 and are more robust and less costly.

Figure 12:
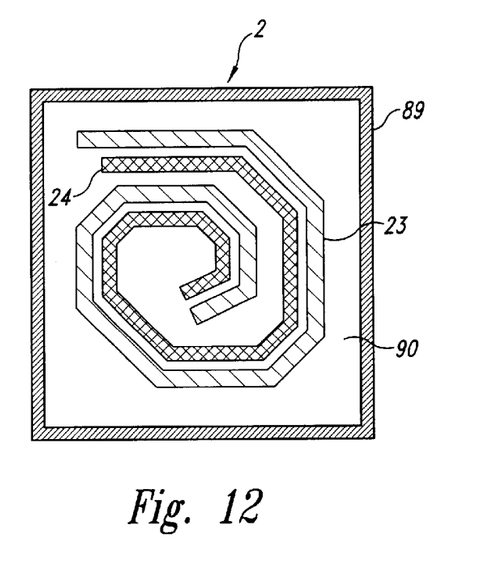
FIG. 12 is a top elevational view of a fifth embodiment of the cells shown in FIG. 2.

A fifth embodiment of the sensor cell 2 is shown in FIG. 12. In the sensor cell 2 of FIG. 12 the first and second capacitor plates 23, 24, are arranged in a spiral pattern. As in the other patterns, the first capacitor plate 23 is separated from the second capacitor plate 24 and from the ground ring 89 by the first passivation layer 90. The spiral pattern shown in FIG. 12 has a greater total perimeter, but a less total area than the capacitor pattern shown in FIGS. 10 and 11. As a result, the spiral pattern of FIG. 12 likely will be more sensitive to very small objects, such as water vapor, likely will be less sensitive to large objects, such as fingers because its lower total area produces less total capacitance.

Figure 13:
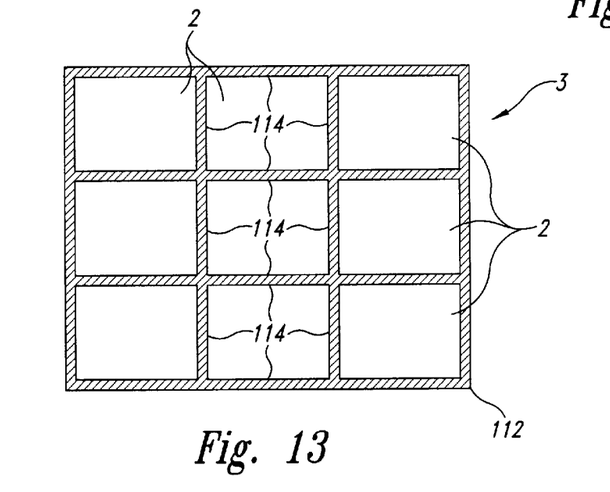
FIG. 13 is a top elevational view of an array of sensor cells of a sensor device according to the present invention.

A top elevational view of the array 3 of sensor cell 2 of the sensor device 1 is shown in FIG. 13. In the embodiments shown in FIG. 13, each of the sensor cells 2 is square, although other rectangles and other shapes could be employed depending on the application. Each sensor cell, 2 typically will be from an approximately 25×25 $\mu m$ to approximately 100×100 $\mu m$. In one implication, each sensor cell is 50×50 $\mu m$ which corresponds to a 508 dots per inch (dpi) resolution.

In the embodiment shown in FIG. 13, the ground rings 89 are shared by adjacent sensor cells 2 to produce a grounding element grid 112. The grounding element grid 112 includes grounding grid segments 114 between each cell and its immediately adjacent cells. Such a grounding element grid insures that any ESD produced by the object being sensed will be discharged through the grounding element grid directly to ground rather than through the capacitor plates 23, 24. Each of the sensor cells 2 of the array 3 can include the same pattern of capacitor plates 23, 24 or plural capacitor patterns could be employed depending on the application. Each sensor cell 2 can imply any of the capacitor patterns shown in FIGS. 8–12 or numerous other capacitor patterns such as fractal patterns and numerous other shapes.

The sensor cells 2 described above are preferably formed using conventional silicon integrated circuit methodology. More particularly, all of the elements of the sensor device 1 shown in FIGS. 1–6 can be integrated on a single chip. Alternatively, one or more of the elements, such as the oscillator 46, can be made separately and coupled to the integrated elements of the sensor device 1.

The sensor device shown in FIGS. 1–6 and 8–13 has at least the following advantages. In particular, as stated, the sensor device provides for a high degree of precision with no need for complex processing of the output signal. Further, the sensor device may be produced easily and integrated using current microelectronic technology and is highly reliable, compact, and cheap to produce.

The sensor device according to the invention may also be used to advantage in other applications requiring precise detection of small distances.

Moreover, the simple design of each cell enables a large number of cells to be accommodated in array structures for detecting two-dimensional physical quantities.

Clearly, changes may be made to the device as described and illustrated herein without, however, departing from the scope of the present invention. In particular, if fabrication techniques enabling the formation of elastic structures (micromachining techniques) are available, the electrode whose distance is being measured may be connected directly to the input or output of inverting amplifier 13 to eliminate one of capacitor plates 23, 24. Moreover, all the components may be replaced by technical equivalents. For example, though an inverter such as inverting amplifier 13 is currently preferred for design and layout reasons, amplifier 13 may be implemented by any inverting or differential amplifier (e.g., an operational amplifier) in a charge amplifier configuration to increase the speed of the output signal.

What is claimed is:

1. An integrated sensor device for detecting a distance between the sensor device and an object, the sensor device comprising:
   a first capacitor plate for forming a first capacitance between the first capacitor plate and the object when positioned adjacent to the object;
   a second capacitor plate for forming a second capacitance between the second capacitor plate and the object when positioned adjacent to the object, the first and second capacitor plates being arranged in a substantially planar pattern in which a plurality of faces of the first capacitor plate are positioned adjacent to and facing a plurality of faces of the second capacitor plate; and
   an amplifier having an input and an output, the input being connected to one of the first and second capacitor plates and the output being connected to another one of the first and second capacitor plates to form a negative feedback branch that includes the first and second capacitances, whereby an output voltage is established at the amplifier output that is proportional to a distance between the first capacitor plate and the object.

2. The sensor device of claim 1, further comprising a layer of insulating material contacting outer surfaces of the first and second capacitor plates, such that the insulating material is positioned between the capacitor plates and the object.

3. The sensor device of claim 1, further comprising:
   a grounding element surrounding the first and second capacitor plates in a plane, the grounding element being coupled to ground to provide a discharge path for electrostatic discharge caused by the object.

4. The sensor device of claim 1 wherein the first and second capacitor plates are arranged in an interdigitating pattern in which fingers of the first capacitor plate are interspersed with fingers of the second capacitor plate.

5. The sensor device of claim 4 wherein the first capacitor plate surrounds the second capacitor plate in a plane.

6. The sensor device of claim 1 wherein the first and second capacitor plates are arranged in a spiral pattern.

7. The sensor device of claim 1 wherein the first capacitor plate is C-shaped and has two ends that define a gap and the second capacitor plate includes an inner portion surrounded on at least three sides by the first capacitor plate, an outer portion positioned outside the first capacitor plate, and a connector portion connecting the inner portion with the outer portion.

8. The sensor device of claim 1 wherein the first capacitor plate includes two rectangular portions positioned in diagonally opposite sections of a rectangular sensor cell and a connector portion that connects the two rectangular portions and the second capacitor plate includes two rectangular portions positioned in diagonally opposite sections of the rectangular sensor cell and a connector portion that connects the two rectangular portions of the second capacitor plate and crosses the connector portion of the first capacitor plate.

9. An integrated sensor device for detecting a distance between the sensor device and an object, the sensor device comprising:
   a plurality of individual sensor cells having first and second adjacent capacitor plates and insulation therebetween, each capacitor plate having a first face for facing the object and a plurality of sidewall faces facing a plurality of sidewall faces of the adjacent capacitor plate within the sensor cell;
   an insulating layer covering the first faces of the first and second capacitor plates; and
   an inverting amplifier having an input coupled to one of the first and second capacitor plates and an output coupled to another one of the first and second capacitor plates,
   whereby the object positioned adjacent to the insulating layer opposite the sensor cells forms a third capacitor plate that faces the first face of the respective first and second capacitor plates, and in combination with the first and second capacitor plates, defines a pair of feedback capacitances between the input and the output of the inverting amplifier.

10. The sensor device of claim 9, wherein the plurality of individual sensor cells further comprises a substantially planar array of sensor cells.

11. The sensor device of claim 10, further comprising a ground ring surrounding each sensor cell.

12. The sensor device of claim 11, wherein the second faces of the first and second capacitor plates each further comprise a plurality of second faces.

13. The sensor device of claim 11, wherein the first face of each of the first and second capacitor plates firther comprises a substantially equal area.

14. The sensor device of claim 11, wherein the insulating layer covering the first faces of the first and second capacitor plates further comprises a dielectric insulating layer.

15. The sensor device of claim 11, further comprising horizontal and vertical scanning stages coupled to the individual sensor cells of the array of sensor cells, whereby the individual cells are enabled according to a predetermined scanning pattern.

16. An integrated sensor device for detecting a distance between the sensor device and an object, the sensor device comprising:
   a first capacitor electrode, the first electrode having a top face and a plurality of side faces, the side faces being in a different plane than its top face;
   a second capacitor electrode, the second electrode having a top face and a plurality of side faces, the side faces being in a different plane than its top face;
   an amplifier circuit having an input terminal and an output terminal;
   an electrical connection between the first capacitor electrode and the input terminal of the amplifier circuit;
   an electrical connection between the second capacitor electrode and the output terminal of the amplifier circuit;
   an insulating material positioned between the first and second electrodes, the first and second electrodes being positioned having their top faces generally parallel to each other and the plurality of respective side faces positioned facing each other to form a capacitor between the respective side faces of the two electrodes; and
   an insulating layer positioned over the first and second electrodes, the insulating layer having an upper surface for receiving an object whose distance from the sensor device is to be measured.

17. The sensor according to claim 16 in which the first capacitor electrode has at least six side faces, in addition to the top face.

18. The sensor according to claim 17 in which the first capacitor electrode has at least nine side faces, in addition to the top face.

19. The sensor according to claim 17 in which the second capacitor electrode has at least six side faces, each of the six side faces being adjacent a respective side face of the first capacitor electrode.

20. The sensor according to claim 18 in which the second capacitor electrode has at least nine faces, each of the nine faces being adjacent to a respective side face of the first capacitor electrode.

21. An integrated capacitive fingerprint sensor for outputting a fingerprint pattern of a fingerprint of a user, the fingerprint sensor comprising:

a plurality of capacitor sensor cells, each having a capacitor therein;

a first capacitor plate within each sensor cell, each capacitor plate having a top face, a bottom face, and a plurality of side faces;

a second capacitor plate within each sensor cell, each second capacitor plate having a top face, a bottom face and a plurality of side faces, at least some of the plurality of the side faces of the first capacitor plate being adjacent to and facing a plurality of the side faces of the second capacitor plate;

a feedback circuit having the first capacitor plate coupled to the input of the feedback circuit and the second capacitor plate coupled to the output of the feedback circuit to provide a negative feedback path having the capacitor formed by the first and second capacitor plates as part of the negative feedback path;

an insulating layer between the first and second capacitor plates for providing a first capacitive feedback value when the fingerprint is not adjacent the capacitive sensor and a second capacitive feedback value different from the first capacitance feedback value when the fingerprint is adjacent the capacitive sensor.

* * * * *